United States Patent
Püttmer

(10) Patent No.: US 8,850,880 B2
(45) Date of Patent: Oct. 7, 2014

(54) DIAGNOSTIC SYSTEM FOR A VALVE

(75) Inventor: Alf Püttmer, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 394 days.

(21) Appl. No.: 13/394,790

(22) PCT Filed: Jun. 18, 2010

(86) PCT No.: PCT/EP2010/058606
§ 371 (c)(1),
(2), (4) Date: May 11, 2012

(87) PCT Pub. No.: WO2011/026666
PCT Pub. Date: Mar. 10, 2011

(65) Prior Publication Data
US 2012/0211097 A1    Aug. 23, 2012

(30) Foreign Application Priority Data

Sep. 7, 2009    (DE) .......................... 10 2009 040 397

(51) Int. Cl.
*G01M 3/28*    (2006.01)
*F16K 37/00*    (2006.01)

(52) U.S. Cl.
CPC ................................ *F16K 37/0083* (2013.01)
USPC ............................................... 73/168; 73/47

(58) Field of Classification Search
USPC ........... 137/551, 552; 72/40, 40.5 R, 47, 168; 702/51
See application file for complete search history.

(56) References Cited

U.S. PATENT DOCUMENTS

| | | | |
|---|---|---|---|
| 3,864,960 A * | 2/1975 | Fletcher et al. | 73/46 |
| 3,921,435 A | 11/1975 | Howard | |
| 4,675,834 A * | 6/1987 | Furuse | 702/51 |
| 4,852,054 A * | 7/1989 | Mastandrea | 702/51 |
| 4,896,530 A * | 1/1990 | Lehmann | 73/49.2 |
| 4,922,233 A | 5/1990 | Twerdochlib | |
| 5,251,148 A * | 10/1993 | Haines et al. | 700/282 |
| 5,616,829 A | 4/1997 | Balaschak et al. | |
| 6,530,277 B2 | 3/2003 | Kumpfmueller | |
| 6,804,990 B2 * | 10/2004 | Weber | 73/40 |
| 8,161,800 B2 * | 4/2012 | Summers et al. | 73/40.5 R |
| 2004/0149831 A1 | 8/2004 | Sheeran et al. | |
| 2007/0068225 A1 | 3/2007 | Brown | |
| 2010/0154515 A1 * | 6/2010 | Killion et al. | 73/40.5 A |
| 2011/0100488 A1 * | 5/2011 | Somrah | 73/49.1 |
| 2013/0152673 A1 * | 6/2013 | Young et al. | 73/40.7 |

FOREIGN PATENT DOCUMENTS

DE    198 18 712    11/1999
DE    199 24 377    12/2000

* cited by examiner

*Primary Examiner* — John Rivell
(74) *Attorney, Agent, or Firm* — Cozen O'Connor

(57) ABSTRACT

A valve that can be actuated by a position controller via a drive, wherein the position controller has a housing and is fastened to the valve by the housing. A first temperature sensor and a second temperature sensor are attached on or in the housing. As a result of the position of both sensors, the temperature measured using the first temperature sensor is more readily influenced by the valve and the temperature registered by the second temperature sensor is more readily influenced by the environment. If a gas leak occurs in the valve, a temperature difference occurs that is evaluated for diagnosis of a leak. The diagnostic system is particularly easy to minor implement with minimal effort.

4 Claims, 1 Drawing Sheet

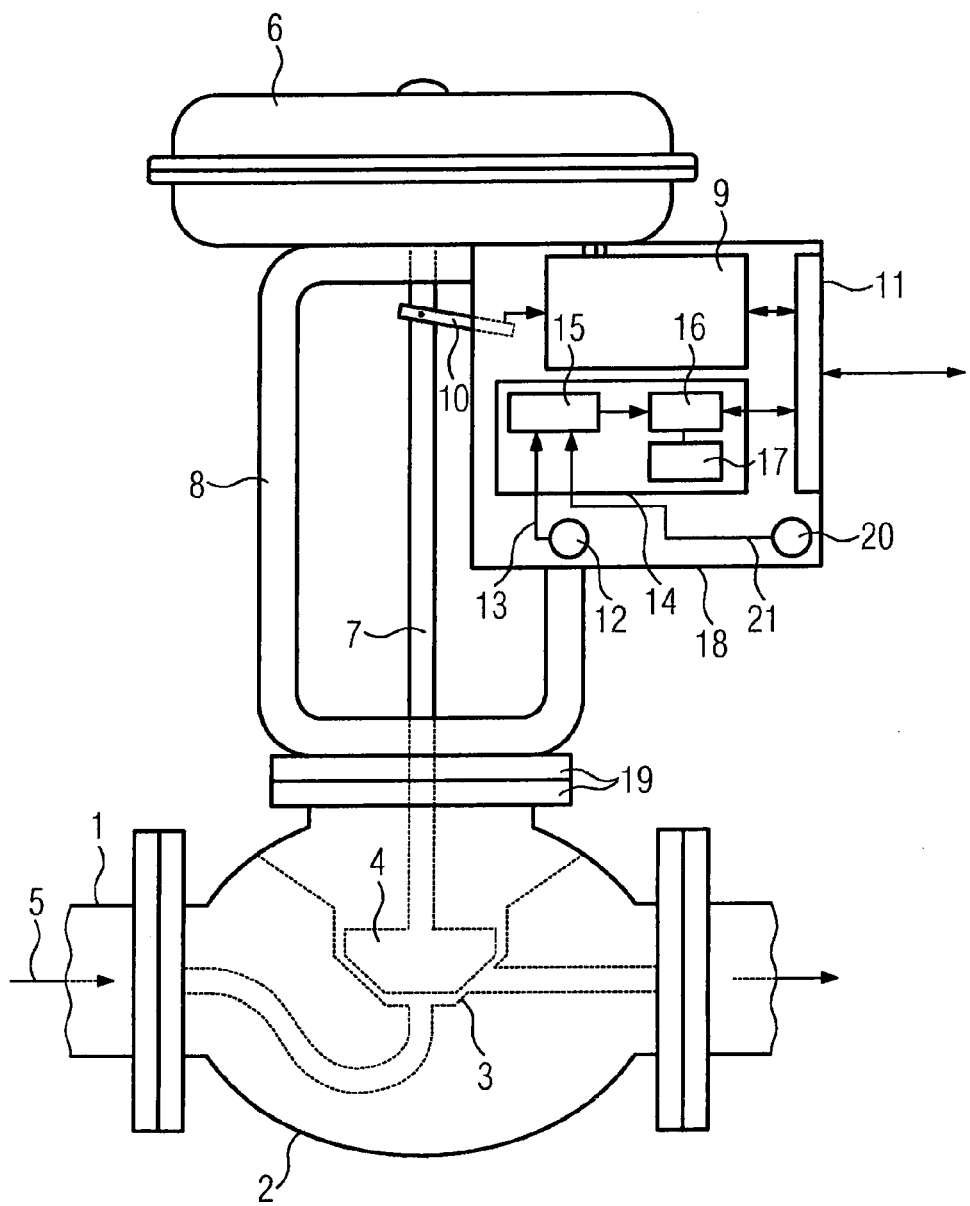

DIAGNOSTIC SYSTEM FOR A VALVE

CROSS-REFERENCE TO RELATED APPLICATIONS

This is a U.S. national stage of application No. PCT/EP2010/058606 filed 18 Jun. 2010. Priority is claimed on German Application No. 10 2009 040 397.3 filed 7 Sep. 2009, the content of which is incorporated herein by reference in its entirety.

BACKGROUND OF THE INVENTION

1. Field of the Invention

The invention relates to diagnostic systems and, more particularly, to a diagnostic system for a valve that can be actuated by a position controller via a drive.

2. Description of the Related Art

In many areas of process control engineering and power engineering, trouble-free operation of an installation depends on the proper functioning of the shut-down and control valves that are used. In order to avoid cost-intensive, irregular operational interruptions, it should be possible to detect valve damage as far as possible already in the initial stage, i.e., before a failure of a valve can cause stoppage of the installation. For example, defective valve seats lead to leakage flows that produce a broadband sound emission. Recording and evaluation of the sound emission of a valve can therefore serve to provide earlier detection of valve damage. Since valve damage can lead to faults and expensive consequential cost, it is very useful to conduct a diagnosis, possibly with automatic acquisition and programmable evaluation of the faults. Statistical evaluations of diagnostic data can serve the purpose both of optimizing the servicing processes to replace a damaged valve in good time, and also of assessing the quality of valve manufacturers and classifying them, or of assessing the suitability of specific valves for various types of processes.

DE 199 24 377 A1 discloses a diagnostic system for a valve that can be actuated by a position controller via a drive and has a device for acquiring, storing and evaluating structure-borne noise spectra measured at the valve. In order to enable a particularly reliable valve diagnosis, it is possible to store in the device for acquisition, storage and evaluation a structure-borne noise spectrum acquired with an intact valve that is slightly open.

For the purpose of diagnosis, a structure-borne noise spectrum acquired with a closed valve is compared with what has been stored, and the similarity is used as a criterion for the leakage of the valve. The known diagnostic system has the disadvantage, however, that the acquisition, storage and evaluation of structure-borne noise spectra for the purpose of establishing a leak flow is comparatively expensive. Particularly in the case of Emergency Shut-Down (ESD) valves, however, the desire is to have a simple diagnostic system that can be used by the operator of an installation to establish whether these valves are leaking.

SUMMARY OF THE INVENTION

It is an object of the invention to therefore provide a diagnostic system for a valve that can be actuated by a position controller via a drive and which enables a reliable diagnosis of a leak flow with a particularly low outlay.

This and other objects and advantages are achieved in accordance with the invention by a diagnostic system for a valve that can be actuated by a position controller via a drive, where the position controller includes a housing and is fastened thereby on the valve.

In accordance with the invention, the expansion of a gas at a leakage site of a valve causes a temperature drop. This temperature drop by comparison with the environment is now acquired with the aid of a first temperature sensor, whose measured value depends relatively strongly on the valve, and of a second temperature sensor, which has a better thermal coupling towards the environment, and evaluated to diagnose a leak. If no leak occurs in the valve, the two temperature sensors measure, for example, the same temperature, specifically ambient temperature, for example. However, if a gas leak occurs in the valve, the temperature of the valve is reduced, and the temperature at the first temperature sensor drops sharply in comparison to the temperature measured at the second temperature sensor. It follows that two simple temperature sensors that are comparatively readily available on the market can be used with particular ease to perform a valve diagnosis on the occurrence of an inadmissible leak. Compared with conventional valve diagnosis with the aid of structure-borne noise signals, the diagnostic system in accordance with the invention has the advantage that it is possible to dispense with a structure-borne noise sensor and evaluation of structure-borne noise spectra, which are comparatively expensive. The two temperature sensors are located at or in the housing of the position controller. As a result, there is, in addition, no need for expensive mounting of the temperature sensors, nor for any sort of cabling for connecting the temperature sensors to an evaluation device. A diagnostic system is therefore obtained that is distinguished by a particularly low outlay on implementation.

In accordance with a particularly advantageous embodiment, the evaluation device, which processes the two measured temperature values in order to obtain a diagnostic statement, is integrated in the position controller. Specifically to perform the control tasks, it is customary to provide position controllers with a microcontroller that is suitably programmed. Consequently, all that is required is to load the program memory of the microcontroller with an additional program routine to implement the evaluation device. By contrast, with a conventional position controller, such a diagnostic system is associated with a low additional outlay, because there is only a need to add software that can run on the hardware already present.

A particularly reliable diagnostic statement can advantageously be obtained when the maximum deviation between the two measured temperature values, upon the overshooting of which a leak is established, is determined with the aid of a temperature deviation acquired with an intact valve during the operation of a slightly opened valve, and stored. For this purpose, it is possible to open an intact valve by a small gap, such as 2% of its manipulating range. The reference measurement is preferably performed with the same medium that is also then flowing through the valve when it is installed in the processing installation. In order for the reference value to be particularly informative in the respective instance of application, it can advantageously be acquired during the commissioning of the valve in the processing installation, and can be stored for later comparison so as to diagnose leakage of the closed valve. It is then a function of the respective process environment and specific to the particular example.

Particularly simple mounting is advantageously achieved when the position controller, the temperature sensors and the evaluation device are arranged in a common housing. This has the additional advantage for the case of use in locations subject to explosion that only one housing need be designed as a pressuretight encapsulation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWING

Together with refinements and advantages, the invention is explained in more detail below with the aid of the drawing, in which:

The sole FIGURE shows a schematic block diagram of a control valve having a diagnostic system in accordance with an embodiment of the invention.

DETAILED DESCRIPTION OF THE PREFERRED EMBODIMENTS

With reference to the FIGURE, fitted in a pipeline 1 of a processing installation (not further illustrated) is a valve 2 that controls the flow rate of a medium 5 by an appropriate stroke of a closing member 4 cooperating with a valve seat 3. The stroke is produced by a pneumatic drive 6 and transmitted to the closing member 4 by a valve stem 7. The drive 6 is connected to the housing of the valve 2 via a yoke 8 and flange 19. Fitted on the yoke 8 is a position controller 9 that uses a connecting element 10 acting on the valve stem 7 to acquire the stroke on the input side and compare the acquired stroke with a desired value fed by a field bus via a data interface 11 and, on the output side, controls the pneumatic drive 6 so as to correct the system deviation.

A first temperature sensor 12 for generating a first temperature signal 13 is fitted to a fastening screw of a housing 18 of the position controller 9. A second temperature sensor 20, which supplies a second temperature signal 21, is located at a greater distance from the yoke 8, and therefore has a substantially poorer thermal coupling with the valve 2. The two temperature signals 13 and 21 are fed to an evaluation device 14 which includes a signal conditioning circuit 15 in which the temperature signals 13 and 21 are filtered and digitized. The difference between a first temperature value thus obtained, with the aid of the first temperature signal 13 and a second temperature value obtained from the second temperature signal 21, is calculated in an arithmetic unit 16 arranged downstream, and compared with a reference value that is stored in a memory 17. When the first temperature value is lower than the second temperature value by more than a maximum deviation prescribed as a reference value, the evaluation device 14 is used to establish a leak of the valve, and an appropriate message is output via the data interface 11 as a signal to thereby display a valve leak.

The diagnosis of the valve is executed periodically, or prompted via the data interface 11 by which the result of the diagnosis can also be interrogated. Position controller 9, first temperature sensor 12, second temperature sensor 20 and evaluation device 14 are arranged in the common housing 18 that is equipped with a pressuretight encapsulation for the use in locations subject to explosion. Externally guided connecting cables between the electronic components of the control valve are thereby avoided.

The reference value stored in the memory 17 is determined during the commissioning of the control valve 2 during the installation process in which, for example, it has the function of an Emergency Shut-Down (ESD) valve. At this point in time, the valve is intact and still exhibits no leak in the closed state. To simulate a leak, the valve is opened by a small gap that amounts, for example, to 2% of its maximum opening. Because of the expansion of a gas flowing through the valve 2, a lower temperature ensues at the first temperature sensor 12 than at the second temperature sensor 20. The temperature difference thus determined is stored as the reference value, and used for the later valve diagnosis in the closed state of the valve.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A diagnostic system for a valve, comprising:
a drive;
a position controller having a housing and being fastened on the valve by the housing, the valve being actuatable by the position controller via the drive;
a first temperature sensor on or in the housing of the position controller, the first temperature sensor having a high level of thermal coupling with the valve and a low level of thermal coupling with an environment;
a second temperature sensor on or in the housing of the position controller, the second temperature sensor having at least one of a lower level of thermal coupling with the valve and a higher level of thermal coupling with the environment than that of the first temperature sensor; and
an evaluation device configured to compare a first temperature value, acquired by the first temperature sensor, with a second temperature value, acquired by the second temperature sensor, and to output a signal indicating a valve leak when the first temperature value is lower than the second temperature value by more than a prescribed maximum deviation.

2. The diagnostic system as claimed in claim 1, wherein the evaluation device is integrated into the housing of the position controller.

3. The diagnostic system as claimed in claim 1, wherein the maximum deviation is determined, based on a temperature deviation acquired when the valve is intact during operation when the valve is slightly opened, and stored.

4. The diagnostic system as claimed in claim 2, wherein the maximum deviation is determined, based on a temperature deviation acquired when the valve is intact during operation when the valve is slightly opened, and stored.

* * * * *